(12) United States Patent
Kim

(10) Patent No.: US 10,182,613 B2
(45) Date of Patent: Jan. 22, 2019

(54) SOLE OF SHOE HAVING PARTIALLY ADJUSTABLE HEIGHT DEPENDING ON INCLINATION

(71) Applicant: Yong Soo Kim, Changwon-si (KR)

(72) Inventor: Yong Soo Kim, Changwon-si (KR)

( * ) Notice: Subject to any disclaimer, the term of this patent is extended or adjusted under 35 U.S.C. 154(b) by 84 days.

(21) Appl. No.: 15/135,871

(22) Filed: Apr. 22, 2016

(65) Prior Publication Data

US 2017/0071287 A1    Mar. 16, 2017

(30) Foreign Application Priority Data

Sep. 16, 2015 (KR) .......................... 10-2015-0130834

(51) Int. Cl.
    *A43B 13/18* (2006.01)
    *A43B 13/20* (2006.01)
    *F16K 15/04* (2006.01)

(52) U.S. Cl.
    CPC .......... *A43B 13/181* (2013.01); *A43B 13/186* (2013.01); *A43B 13/189* (2013.01); *A43B 13/20* (2013.01); *A43B 13/203* (2013.01); *F16K 15/04* (2013.01); *F16K 15/048* (2013.01)

(58) Field of Classification Search
    CPC ... A43B 13/181; A43B 13/186; A43B 13/189; A43B 13/20; A43B 13/203; A43B 13/206; F16K 15/04; F16K 15/048
    USPC .............................................. 36/28, 29, 35 B
    See application file for complete search history.

(56) References Cited

U.S. PATENT DOCUMENTS

| 4,446,634 A | * | 5/1984 | Johnson | ............... | A43B 13/206 36/28 |
| 5,179,792 A | | 1/1993 | Brantingham | | |
| 5,598,645 A | | 2/1997 | Kaiser | | |
| 5,673,498 A | * | 10/1997 | Amir | .................... | A43B 13/203 36/28 |
| 5,706,589 A | * | 1/1998 | Marc | ...................... | A43B 13/18 36/27 |

(Continued)

FOREIGN PATENT DOCUMENTS

| GB | 1217554 A | 12/1970 |
| JP | H10196817 A | 7/1998 |

(Continued)

OTHER PUBLICATIONS

KIPO, Korean Office Action (KR 10-2015-0130834), dated Mar. 30, 2016.

(Continued)

*Primary Examiner* — Jameson Collier
(74) *Attorney, Agent, or Firm* — Hauptman Ham, LLP

(57) ABSTRACT

A shoe sole includes a sole contact portion 42, a ground contact portion 44, a plurality of fluid casings 12 configured to include a pair of fluid casings arranged in the front and rear direction and a pair of fluid casings arranged in the left and right direction between the sole contact portion and the ground contact portion and made of an elastic material, and plurality of valve units 20 and 30 configured to connect the pair of fluid casings in the front and rear direction and the pair of fluid casings in the left and right direction and to permit a flow of a fluid only from fluid casings at a high position to fluid casings at a low position when the sole of the shoe is inclined in the front and rear direction and/or in the left and right direction.

5 Claims, 7 Drawing Sheets

(56) References Cited

U.S. PATENT DOCUMENTS

| | | | | |
|---|---|---|---|---|
| 5,813,142 | A * | 9/1998 | Demon | A43B 3/0005 36/28 |
| 6,170,173 | B1 * | 1/2001 | Caston | A43B 13/203 36/141 |
| 6,457,262 | B1 * | 10/2002 | Swigart | A43B 13/203 36/144 |
| 6,519,873 | B1 * | 2/2003 | Buttigieg | A43B 1/0018 36/29 |
| 7,603,725 | B2 * | 10/2009 | Harris | A42B 3/121 2/410 |
| 8,707,583 | B2 | 4/2014 | Caron et al. | |
| 2003/0056401 | A1 * | 3/2003 | Kwon | A43B 5/001 36/127 |
| 2004/0211085 | A1 * | 10/2004 | Passke | A43B 13/189 36/3 B |
| 2005/0055846 | A1 * | 3/2005 | Caldwell | A43B 13/189 36/29 |
| 2013/0067775 | A1 | 3/2013 | Ellis, III | |
| 2016/0345663 | A1 * | 12/2016 | Walker | A43B 13/143 |

FOREIGN PATENT DOCUMENTS

| | | |
|---|---|---|
| JP | 2007167161 A | 7/2007 |
| JP | 2012016447 A | 1/2012 |
| JP | 2013204698 A | 10/2013 |
| KR | 20-0201418 A | 11/2000 |
| KR | 10-2005-0122149 A | 12/2005 |
| WO | 8200571 A1 | 3/1982 |
| WO | 0170061 A2 | 9/2001 |
| WO | 0226070 A1 | 4/2002 |

OTHER PUBLICATIONS

Japanese Office Action dated May 23, 2017 from JPO in connection with the counterpart Japanese Patent Application No. 2016-083536.
Extended European Search Report dated Jul. 6, 2017 from European Patent Office in connection with the counterpart European Patent Application No. 16165213.6.
Chinese Office Action dated Dec. 8, 2017, in connection with the Chinese Patent Application No. 2016103329325.

* cited by examiner

SOLE OF SHOE HAVING PARTIALLY ADJUSTABLE HEIGHT DEPENDING ON INCLINATION

REFERENCE TO RELATED APPLICATIONS

This application claims the priority benefit of Korean Patent Application No. 10-2015-0130834 filed on Sep. 16, 2015, the entire contents of which are incorporated herein by reference.

FIELD OF THE INVENTION

The present invention relates to the sole of the shoe and, more particularly to the sole of the shoe, which is configured to have a sense of balance by adjusting the height of a fluid casing embedded in the sole, with respect to the inclination of ground in the left and right or front and rear direction.

BACKGROUND OF THE INVENTION

In general, a variety of types of shoes, such as hiking boots and golf shoes, in addition to common walking boots frequently worn in daily life are produced and come into the market. In such shoes, one of the most important functions may be said to be comfortable feeling in the feet when walking. Such comfortable feeling of the feet may be said to be based on cushioning.

In order to provide comfortable feeling when a person wears shoes as described above, a cushion function is recognized as being one of the most important functions in the manufacture of shoes, and various proposals for the cushion function are being made. For example, shoes disclosed in U.S. Pat. No. 8,707,583 B2 provide comfortable feeling (cosiness) when a person wears the shoes and provide a less sense of fatigue while walking for a long time by providing an air cushion function through the entry and exit of air.

SUMMARY OF THE INVENTION

As described above, it may be seen that it is important to design shoes so that the shoes have a structure capable of more activating a cushion function in order for a wearer to have comfortable feeling or cosiness when walking. In addition to the air cushion function sought by many recent shoe manufacturers, however, how much can the soles of shoes maintain horizontality may be said to be an important thing when wearing shoes and when walking.

For example, if a person who wears shoes walks in the ground that perfectly forms a horizontal plane, he or she can have convenient and comfortable feeling. If a person who wears shoes walks in an inclined plane in the front and rear or left and right direction, he or she may inevitably feel inconvenient due to the slope itself although the shoes have any cushion function.

Accordingly, it may be said that convenience or inconvenience felt by a person who wears the shoes depending on the incline state of the ground rather than comfortable feeling or cosiness attributable to the cushion function of the outer soles of the shoes on which recent shoe manufacturers focus their efforts has a greater effect. The present invention has been made keeping in mind the above problems occurring in the prior art and proposes a sole capable of providing a wearer with relatively more comfortable feeling although the wearer walks in the ground having a slope.

The present invention provides the sole of the shoe, which is capable of providing a wearer with convenient and comfortable feeling by adjusting the incline state so that it becomes close to the horizontal state as much as possible although the wearer walks in the ground inclined in the front and rear direction or the ground inclined in the left and right direction.

The present invention also provides the sole of the shoe, which is capable of reducing a danger of injury and also suppressing the exhaustion of physical strength attributable to a gradient as little as possible by correcting the incline state so that it becomes close to the horizontal state in an inclined ground.

The present invention also provides the sole of the shoe, which can have a sufficient cushion function of a fluid, which is light in weight, and which has a sufficient height.

In an aspect, the sole of a shoe includes a sole contact portion configured to come in contact with a sole of a shoe wearer; a ground contact portion configured to come in contact with a ground while walking; a plurality of fluid casings including a pair of fluid casings arranged in a front and rear direction and a pair of fluid casings arranged in a left and right direction between the sole contact portion and the ground contact portion, and being made of an elastic material; and a plurality of valve units configured to connect the pair of fluid casings in the front and rear direction and the pair of fluid casings in the left and right direction respectively and to permit a flow of a fluid only from fluid casings at a high position to fluid casings at a low position when the sole of the shoe becomes a state in which the sole is inclined in at least one of the front and rear direction and the left and right direction; wherein the height of the fluid casings at low position could be increased by the flow of fluid being introduced from the fluid casings at high position to the fluid casings at low position by pressure applied to the fluid casings at high position, when the sole of the shoe is inclined.

Furthermore, in accordance with a first embodiment of the present invention, each of the valve units include, an valve body having an internal passage through which the fluid within the fluid casing is able to pass, a pair of ball seating portions formed on both inner end of the internal passage, a check ball configured to permit a flow of the fluid only in one direction when the check ball is seated in any one of the ball seating portions and to permit a bidirectional flow of the fluid when it is in the middle of internal passage, and a pair of connecting passages connected to the fluid casings in the front and rear direction and the fluid casings in the left and right direction, respectively, through the ball seating portions. And the check ball is made of a material having a greater specific gravity than the fluid, so it sinks in the fluid. And the connecting passages connect fluid casings and valve bodies in opposite directions. And the check balls will be seated in the ball seating portion at low positions when the valve unit are inclined, so that the fluid flows only from the fluid casings at high positions to the fluid casings at low positions.

Furthermore, in accordance with a second embodiment of the present invention, each of the valve units includes, a valve body having an internal passage through which the fluid within the fluid casing is able to pass, a pair of ball seating portions formed on both inner end of the internal passage, a check ball configured to permit a flow of the fluid only in one direction when the check ball is seated in any one of the ball seating portions and to permit a bidirectional flow of the fluid when it is in the middle of internal passage, and a pair of connecting passages connected to the fluid casings in the front and rear direction and the fluid casings in the left and right direction, respectively, through the ball seating portions. Here, the check balls are made of a material having a smaller specific gravity than the fluid, so having buoyant force in the fluid. And the connecting passages connect valve bodies and adjacent fluid casings. The check ball are seated in the ball seating portion at high positions when the valve unit are inclined, so that the fluid flows only from the fluid casings at high positions to the fluid casings at low positions.

In an embodiment of the present invention, the fluid casing may be made of a material having an elastic restoring force.

Furthermore, in an aspect, a sole for a shoe includes, a sole contact portion configured to come in contact with a sole of a shoe wearer; a ground contact portion configured to come in contact with a ground while walking; a pair of fluid casings arranged in a front and rear direction between the sole contact portion and the ground contact portion, and being made of an elastic material; and a valve unit configured to connect the fluid casings and to permit a flow of a fluid only from a fluid casing at a high position to a fluid casing at a low position when the sole of the shoe is inclined in the front and rear direction. The height of the fluid casing at low position could be increased by the flow of fluid being introduced from the fluid casing at high position to the fluid casing at low position, by pressure applied to the fluid casing at high position, when the sole of the shoe is inclined.

In an aspect, a sole for a shoe includes, a sole contact portion configured to come in contact with a sole of a shoe wearer; a ground contact portion configured to come in contact with a ground while walking; a pair of fluid casings arranged in a left and right direction, between the sole contact portion and the ground contact portion and being made of an elastic material; and a valve unit configured to connect the pair of fluid casings and to permit a flow of a fluid only from a fluid casing at a high position to a fluid casing at a low position when the sole of the shoe is inclined in the left and right direction. Here, the height of the fluid casing at low position could be increased by the flow of fluid being introduced from the fluid casing at high position to the fluid casing at low position, by pressure applied to the fluid casing at high position, when the sole of the shoe is inclined.

In accordance with the sole of the shoe according to the present invention, height is increased in the ground inclined in the front and rear direction or the ground inclined in the left and right direction because a fluid is introduced into the fluid casing placed at a low position. Accordingly, a slope or inclination of the upper surface of the sole can be adjusted so that the address of a person who wears the shoes becomes close a horizontal state. If the slope in the front and rear direction and the left and right direction is corrected or adjusted as described above, advantages in which a person who wears the shoes can have comfortable feeling when walking and a danger of an accident can also be sufficiently prevented.

For example, the sole according to an embodiment of the present invention can provide a basic function that facilitates more easy hiking because the height of the heel portion is increased more than usual when a person who wears the shoes walks in an uphill, such as hiking. In the case of a downhill, the height of the heel portion will be reduced. Accordingly, advantages, such as comfortable walking and safe walking, can be expected because the height of an incline in the front and rear direction or an incline in the left and right direction is corrected so that it becomes close to horizontality as described above.

For another example, if the sole according to an embodiment of the present invention is applied to golf shoes, there are significant advantages in that an address posture in an area having slopes in the left and right direction and/or the front and rear direction is very convenient and a stable posture can be taken. Furthermore, if a stable address is provided as described above, it is considered to be directly connected to the improvement of athletic performance.

In addition to golf shoes and hiking boots, an advantage in which convenience and safety are further ensured can be expected because an angle of inclination is corrected so that it becomes close to horizontality in common hiking or walking. Furthermore, there can be expected an advantage in that the exhaustion of physical strength attributable to the slope of the ground can be reduced.

DETAILED DESCRIPTION OF THE INVENTION

Figure 1:
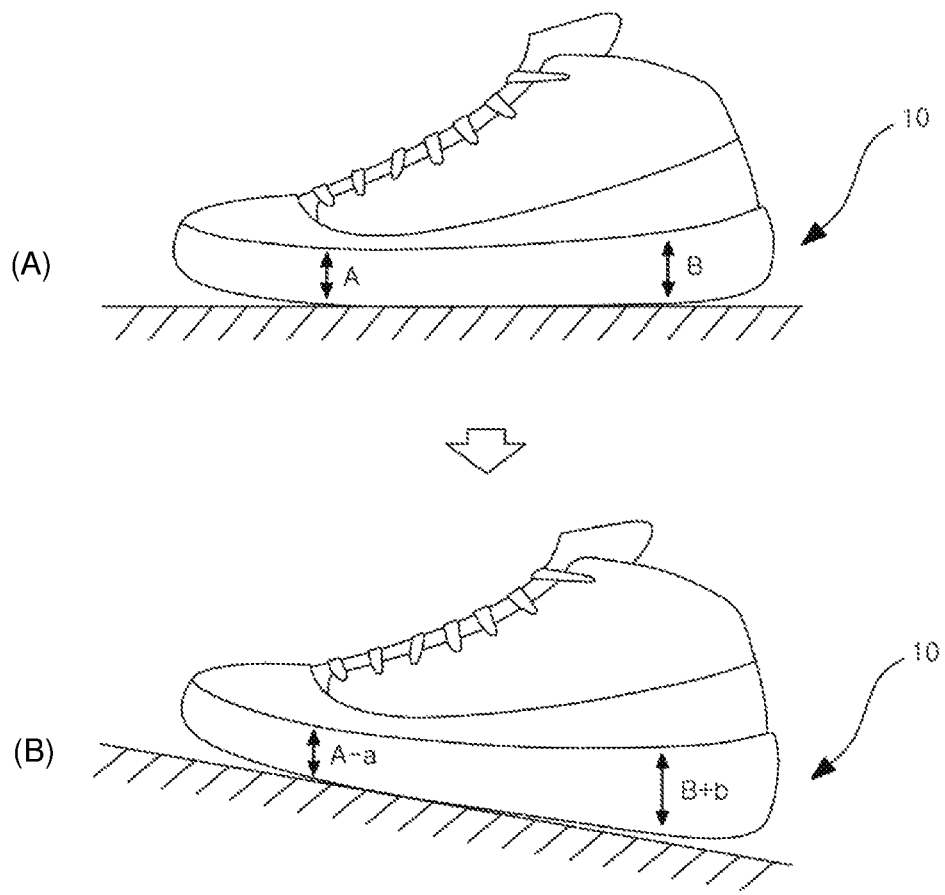
FIG. 1 is an explanatory diagram showing the function of the sole of the shoe according to an embodiment of the present invention in an inclined ground in the front and rear direction.

Embodiments of the present invention are described in detail below with reference to the accompanying drawings. First, a basic function of the sole of the shoe according to an embodiment of the present invention is described with reference to FIGS. 1 and 2. FIG. 1 shows a change of the sole in the ground inclined in the front and rear direction with respect to a walking direction. As shown, when a wearer walks in a horizontal ground, the sole maintains a basic horizontal state (i.e., a basic setting state) without a change of the thickness A, B of the sole as shown in FIG. 1(A). When the sole meets an uphill, it is changed to the state, such as that shown in FIG. 1(B). It may be seen that the state shown in FIG. 1(B) is the state in which the height "A-a" of the back portion of the sole has been lowered and the height "B+b" of the rear portion of the sole has been increased.

Figure 2:
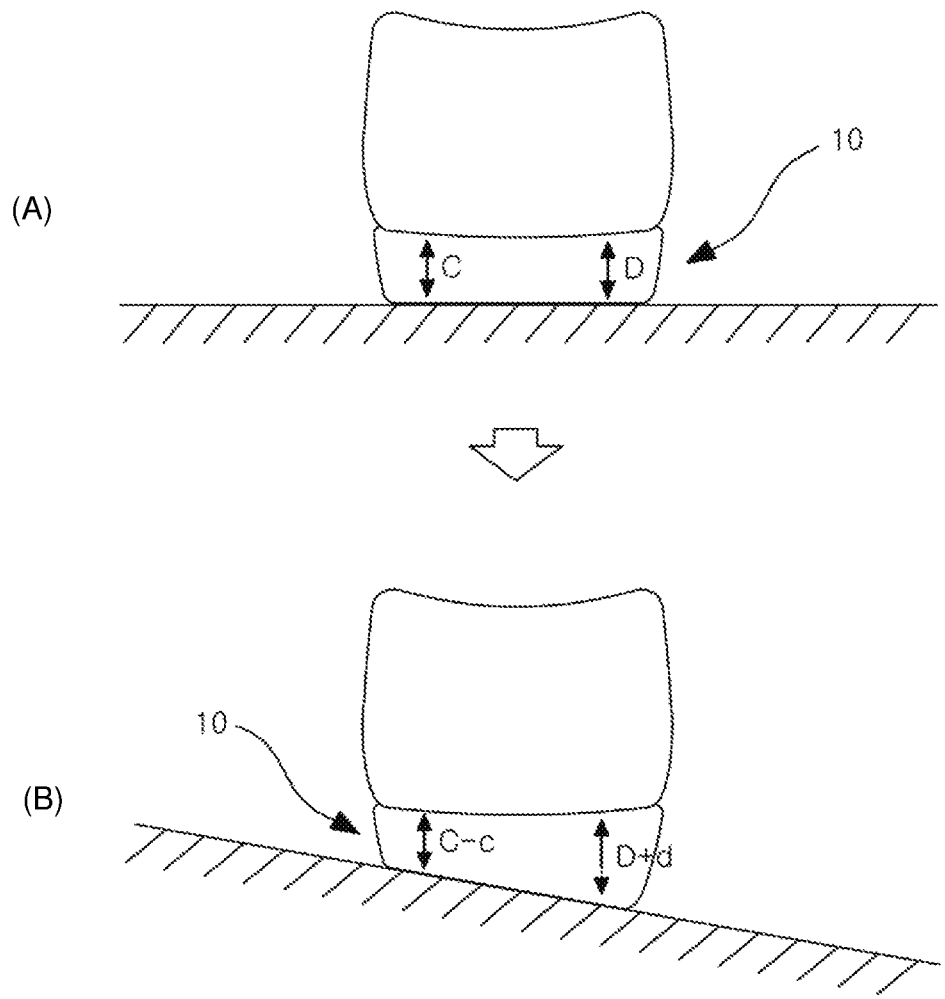
FIG. 2 is an explanatory diagram showing the function of the sole of the shoe according to an embodiment of the present invention in an inclined ground in the left and right direction.

Furthermore, FIG. 2 shows a change of the sole in the ground inclined in the left and right direction with respect to a walking direction. As shown, when a wearer walks in a horizontal ground, the sole maintains a basic horizontal state (i.e., a basic setting state) without a change of the thickness C, D of the sole as shown in FIG. 2(A). When the sole meets the ground inclined in the left and right direction in such a walking state, the height "C-c" of the sole at a high position (i.e., a left portion in FIG. 2(B)) is reduced, and the height "D+d" of the sole at a low position (i.e., a right portion in FIG. 2(B)) is increased. Accordingly, the right portion of the sole becomes high.

As described above, in an embodiment of the present invention, when a person who wears the shoes walks in the ground close to horizontality, the soles of the shoes maintain the set basic state. When the wearer walks in the ground inclined in the front and rear or left and right direction, the height of the sole at a lower position of the inclined ground becomes high, thereby compensating for the inclined plane. Accordingly, the wearer can walk in the state close to a horizontal plane.

Figure 3:
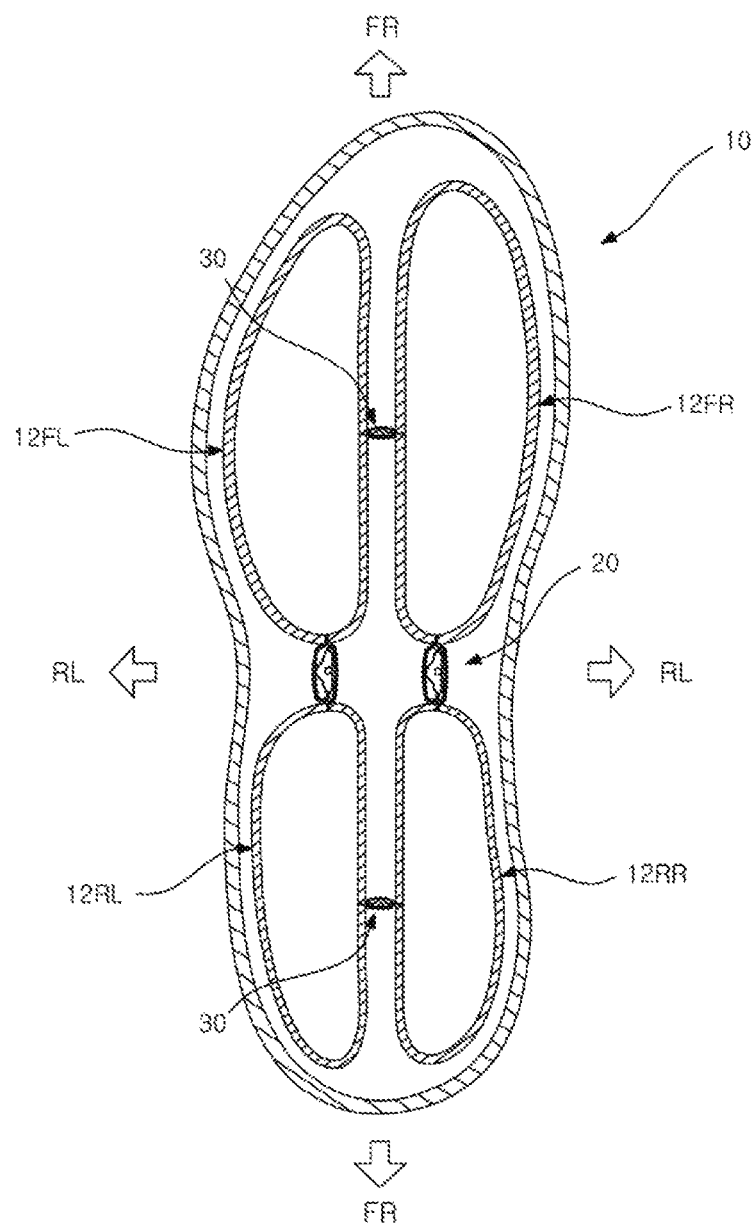
FIG. 3 is an exemplary lateral cross-sectional view of the sole of the shoe including a plurality of fluid casings according to an embodiment of the present invention.
Figure 4:
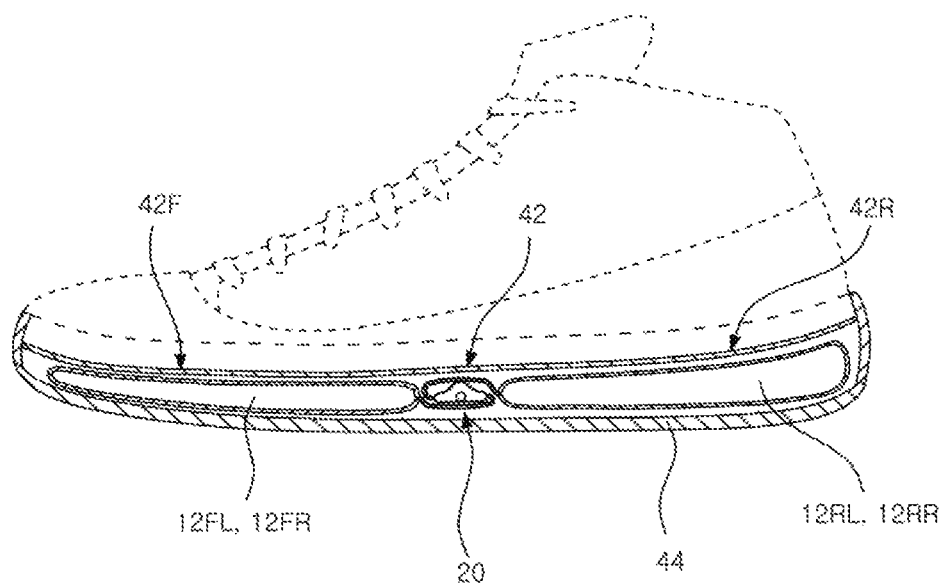
FIG. 4 is a cross-sectional view of the sole of the shoe according to an embodiment of the present invention in the vertical direction of FIG. 3.

Detailed embodiments of the present invention are described below. As may be seen from FIGS. 3 to 5, a plurality of fluid casings 12FL, 12FR, 12RL, and 12RR (all of fluid casings are hereinafter collectively assigned 12) is embedded in the sole 10 of the shoe according to an embodiment of the present invention. The fluid casings 12 have fluids filled therein and are connected to adjacent fluid casings through valve units 20 and 30. For convenience of description, as shown in FIGS. 3 and 4, the valve units that connect the left fluid casings 12FL and 12RL and the right fluid casings 12FR and 12RR respectively are assigned with numeral 20. And, as shown in FIGS. 3 and 5, the valve unit that connect the front fluid casings 12FL and 12FR and the rear fluid casings 12RL and 12RR are assigned with numeral 30.

Figure 5:
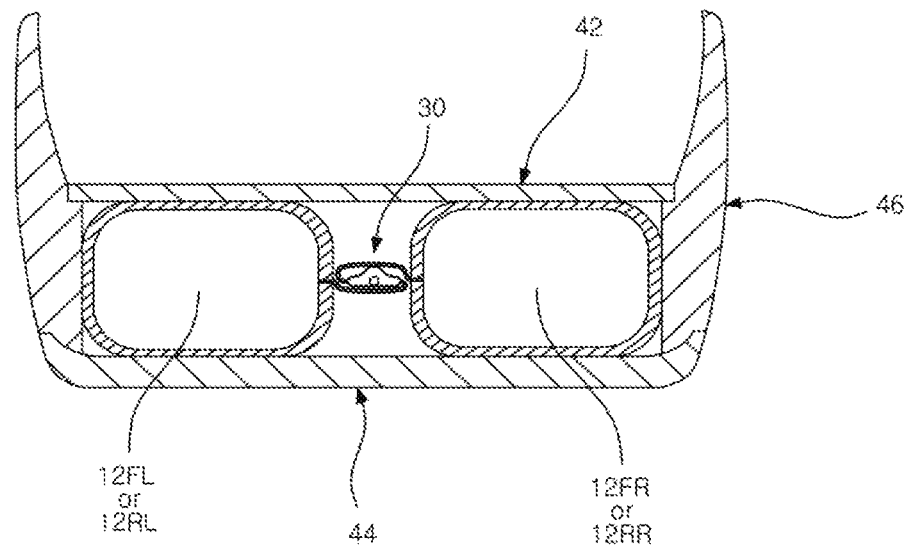
FIG. 5 is a cross-sectional view of the sole of the shoe according to an embodiment of the present invention in the horizontal direction of FIG. 3.

In the embodiment of FIGS. 3 to 5, the fluid casings 12 includes a plurality of fluid casings, for example, pairs of the fluid casings 12FL and 12RL arranged in front and rear direction FR, and a pair of the fluid casings 12FL and 12FR, 12RL and 12RR arranged in the left and right direction RL.

The fluid casings 12FL, 12FR, 12RL, and 12RR are connected with each other that are adjacent to each other in the front and rear or left and right direction by the valve units 20 and 30 respectively. For example, each of the pairs of fluid casings 12FL and 12RL, 12FR and 12RR arranged in the front and rear direction FR is connected by the valve unit 20 (FIG. 4). Each of the pairs of fluid casings 12FL and 12FR, 12RL and 12RR arranged in the left and right direction RL is connected by the valve body 30 (FIG. 5).

Such connection relationships between the fluid casings 12 are described below. It may be said that the pair of fluid casings arranged in the front and rear direction and the pair of fluid casings arranged in the left and right direction are connected so that fluids within the pair of fluid casings can move through the valve units 20 and 30, respectively. Furthermore, the movement of the fluid from one fluid casing to an adjacent fluid casing within the connected fluid casings is determined by the state of the valve units 20 and 30. In the embodiments described above, the sole 10 as shown includes four (4) fluid casings 12FL and 12FR, 12RL and 12RR. However, the present invention is not limited thereto, and the sole may have other number of fluid casings. For example, the sole may have two (2) fluid casings, one at a front side and the other at the rear side of the sole, or alternatively, one at the left side and the other at the right side of the sole, in which the two fluid casings are connected via the valve unit engaged there-between.

As described above, the fluid within one fluid casing 12 according to an embodiment of the present invention can move to the other fluid casing including the fluid connected to the fluid within the fluid casing 12, and the fluid from the other fluid casing can enter one fluid casing 12. Furthermore, the fluid casing 12 may be made of a flexible material. Each fluid casing 12 can increase the height of the sole when the fluid from one fluid casing enters into another fluid casing 12. In an embodiment of the present invention, the height of the fluid casing installed within the sole of the shoe is configured to be changed when the fluid moves from one fluid casing 12 to the other fluid casing because the width of the sole of the shoe is limited. Furthermore, the fluid casing 12 may be made of a material having an elastic restoring force so that it can return to its original state when an external force is not applied to the fluid casing 12.

Furthermore, the valve units 20 and 30 according to an embodiment of the present invention function to regulate the fluid. The valve units 20 and 30 can transmit the fluid only in one direction depending on the slope direction of the sole of the shoe. In the state shown in FIG. 1, that is, in the case of a plane inclined in the front and rear direction FR, more specifically, when a wearer walks in an uphill, the height of the sole for an uphill road can be adjusted only when the height of the fluid casings 12RL and 12RR placed in the rear of the sole 10 of the shoe is increased. Furthermore, as another example of the ground inclined in the front and rear direction, when a wearer walks in a downhill, the height of the sole for a downhill road can be corrected only when the fluid casings 12FL and 12FR placed ahead are billowed and increased in height.

In order for the height of the sole to be corrected with respect to the ground having an incline in the front and rear direction, the fluid needs to move from the fluid casing 12 placed at a high position to the fluid casing 12 placed at a low position in a sole. This means that the fluid should not be moved from the fluid casing 12 at a low position to the fluid casing 12 at a high position. As described above, the valve unit 20 according to an embodiment of the present invention must operate so that the fluid moves from the fluid casing 12 at a high position to the fluid casing 12 at a low position and a flow of the fluid in an opposite direction is not generated.

Figure 6:
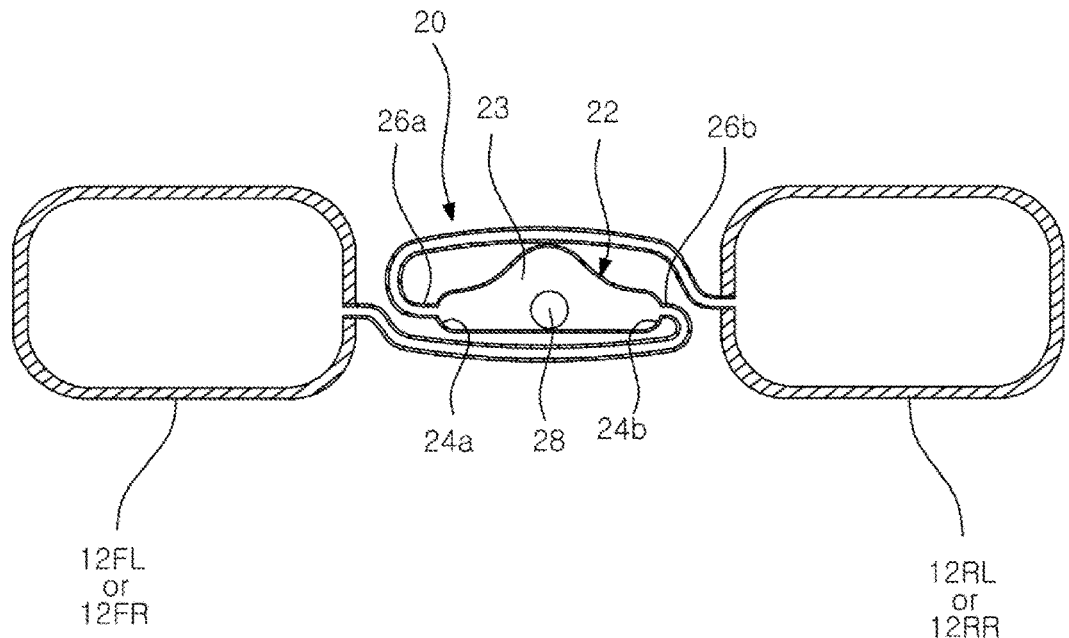
FIG. 6 is an exemplary cross-sectional view in the horizontal state for illustrating a movement of a fluid within the sole of the shoe in the front and rear direction according to an embodiment of the present invention.

The valve units 20 and 30 according to an embodiment of the present invention are described in more detail below. FIG. 6 shows the connection relationship between the fluid casings 12FL and 12RL or 12FR and 12RR placed in the front and rear direction and connected by the valve units 20 respectively. As shown in FIG. 6, the valve units 20 according to an embodiment of the present invention includes, a valve body 22 having an internal passage 23 through which the fluid can flow and a check ball 28 which is embedded in the internal passage 23 of the valve body 22 and which moves according to the slope or inclination of the sole.

The internal passage 23 may be said to be a connection passage through which the fluid within the fluid casing 12 can flow. Ball seating portions 24a and 24b are formed at both inner ends of the internal passage 23. Each of the ball seating portions 24a and 24b has a shape corresponding to part of the appearance of the check ball 28 so that the check ball can closely seat or adhere to the ball seating portion 24a or 24b when it enters and the ball seating portion. In this case, the bottom of the internal passage between the ball seating portions 24a and 24b may be formed to have a horizontal plane so that the check ball 28 can easily move from side to side.

And the both inner ends of the internal passage 23 in which the ball seating portions 24a and 24b have been formed are connected to other fluid casing 12 through connecting passage 26a or 26b, respectively. Accordingly, the fluid within one fluid casing 12 flows to the other fluid casing 12 via one of connecting passages 26a or 26b, internal passage 23 of valve body, and another connecting passages.

Figure 7:
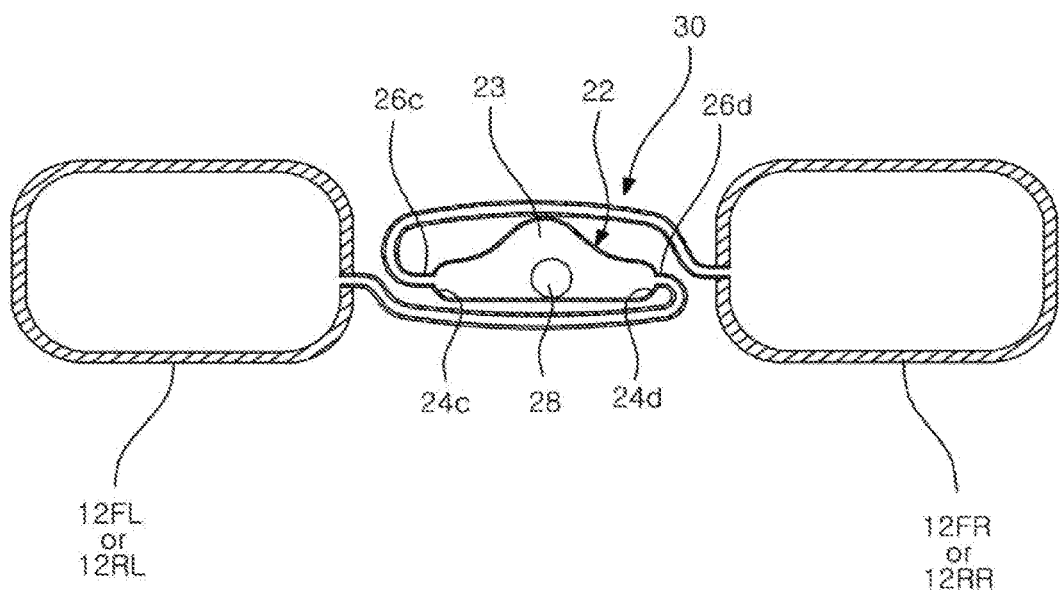
FIG. 7 is an exemplary cross-sectional view in the horizontal state for illustrating a movement of a fluid within the sole of the shoe in the left and right direction according to an embodiment of the present invention.

FIG. 7 shows the connection relationship between the fluid casings 12FL and 12FR or 12RL and 12RR placed on the left and right sides and connected by the valve body 30. The sole of FIG. 7 has the same construction as that of FIG. 6. For convenience of description, however, the fluid casing 12FL or 12RL on the left side is illustrated as being connected to the connecting passage 26d on the right side of the valve body 22, and the fluid casing 12FR or 12RR on the right side is illustrated as being connected to the connecting passage 26c on the left side of the valve body 22. Furthermore, a ball seating portion 24c is illustrated as being formed on the left inner side of the valve body 22, and a ball seating portion 24d is illustrated as being formed on the right inner side of the valve body 22.

In accordance with a first embodiment of the present invention of FIG. 6, the check ball 28 may be made of a material having greater specific gravity than the fluid in the valve body, and the connecting passages 26a and 26b formed on both inner sides of the valve body 22 are connected to the fluid casings 12 placed in opposite directions. That is to say, the connecting passage 26a connects the left side (front portion in the sole) of valve body to fluid casing 12RL which is in right side (rear portion in the sole). And the connecting passage 26b connects the right side (rear portion in the sole) of valve body to fluid casing 12FL which is in left side (front portion in the sole).

In this case, the fact that check ball 28 may be made of a material having greater specific gravity than the fluid means that, for example, the fluid may be made of gas, such as air, and the check ball 28 may be made of a metallic material having sufficient strength. In case that the fluid is a liquid, and the check ball 28 should be made of a metallic material having greater specific gravity than the liquid fluid.

The internal passage 23 means the space through which the fluid can flow. A flow of the fluid within the internal passage 23 is not regulated by the check ball 28. That is, if the check ball 28 is placed in the internal passage 23 without being close contact to any one of the ball seating portions 24a and 24b, the fluid can flow through the internal passage 23 to any connection portions. Furthermore, if the check ball 28 is close contact state to any one of the ball seating portions 24a and 24b, a flow of the fluid to at least one side is regulated. Furthermore, such a description is likewise applied to the fluid casings arranged in the left and right direction and connected by the valve body 30 in FIG. 7.

In the illustrated embodiment, the plurality of fluid casings 12 are connected with each other so that the fluid can move or flow from one fluid casing 12 to the other fluid casing 12 as described above. Furthermore, the fluid casings 12 are connected in the front and rear direction and the left and right direction respectively. The fluid casings 12FL and 12RL placed in the front and rear direction are connected by valve unit 20 and fluid casings 12FR and 12RR placed in the front and rear direction are connected by valve unit 20. And the fluid casings 12FL and 12FR placed on the left and right sides are connected by valve unit 30 and fluid casings 12RL and 12 RR placed on the left and right sides are connected by valve unit 30.

In the embodiment shown in FIG. 6, the fluid casings 12 and the connecting passage 26a and 26b of the valve unit 20 are connected in opposite directions, as explained above. In other words, referring to FIGS. 3 and 6, the connecting passages 26a and 26b formed on both sides of the internal passage 23 are connected to the respective fluid casings 12 placed in the opposite directions. That is, the fluid casings 12FL and 12FR placed in front direction are connected to the respective connecting passages 26b placed in the rear, and the fluid casings 12RL and 12RR placed in the rear portion are connected to the respective connecting passages 26a placed in front portion.

Such connections in the opposite directions are the same for the left and right direction RL. From FIGS. 3 and 7, it may be seen that the fluid casings 12FL and 12RL on the left side are connected to the connecting passages 26d on the right side of the valve bodies 22 and the fluid casings 12FR and 12RR on the right side are connected to the connecting passages 26c on the left side of the valve bodies 22.

In the present embodiment, the check ball 28 has a setting force in the fluid because it has higher specific gravity than the fluid. That is to say, the check ball 28 sinks in the fluid. Accordingly, as shown in FIG. 6, when the sole 10 of the shoe becomes a horizontal state, the check ball 28 is placed in the central portion of the internal passage 23 without any close contact to the ball seating portions 24a and 24b. Furthermore, in this state, when an external force is not applied to the fluid casing 12 or when the same external force is applied to the fluid casings 12 on both sides through both connecting passage 26a and 26b, the fluid does not move.

As may be seen from the aforementioned embodiment, the fluid casing 12 needs to be made of a material having elastic restoring force, so that the fluid casing could be swelled or be inflatable by the entry of the fluid. Thus the height of the sole of the shoe partially is increased. And when the fluid exits from the fluid casing 12, the height of the sole of the shoe is reduced.

As shown in FIGS. 4 and 5, the plurality of fluid casings 12 may be placed between a sole contact portion 42 contacting the sole of a wearer and a ground contact portion 44 that contacting ground while walking. And as described above, the height between the ground contact portion 44 and the sole contact portion 42 may be increased depending on a change of height attributable to a change of the volume of the fluid casing 12.

Furthermore, in an embodiment of the present invention, another parts may be used so that the height of the fluid casing 12 is sufficiently changed when the fluid enters the fluid casing 12 according to a movement of the fluid within another fluid casing. For example, a member configured to come in contact with a side forming member 46 or an edge portion of the fluid casing 12 so that the height of the fluid casing 12 is increased by the entry of the fluid may be used. In some embodiments, the fluid casing 12 according to an embodiment of the present invention may be installed in a partition between the ground contact portion 44 and the sole contact portion 42 so that the height of the fluid casing is changed by the entry of the fluid.

A change of the state when the sole of the shoe according to an embodiment of the present invention is used is described below with reference to FIGS. 6 to 9. When a shoe to which the sole 10 according to an embodiment of the present invention has been applied is completed as shown in FIG. 4, the shoe has a basically designed state. The basic setting state is the state in which the shoe has not been worn and an external force has not been applied to the sole.

In the basic setting state, the sole 10 of the shoe has a predetermined height. For example, the front portion 42F and rear portion 42R of the sole contact portion 42 basically have a predetermined height by the plurality of fluid casings 12. The predetermined height may be set to be slightly higher than the height of the rear portion 42R. That is, in this specification, the basic setting state may mean the state in which the front fluid casings 12FR and 12FL and the rear fluid casings 12RL and 12RR include the predetermined amount of the fluid and have a predetermined height in the front portion 42F and rear portion 42R. Furthermore, in this state, any external force is not applied to all of the fluid casings 12.

In such a basic setting state or the state in which a wearer walks in the ground having a horizontal plane as shown in FIGS. 1(A) and 2(B), the height of the sole 10 of the shoe is not changed generally. In the aforementioned embodiment, the check ball 28 has a setting force for the fluid because it has greater specific gravity than the fluid. Accordingly, as shown in FIG. 6, when the sole 10 of the shoe becomes a horizontal state, the check ball 28 is placed in the central portion of the internal passage 23 without any close contact to any one of the ball seating portions 24a and 24b. In this state, when an external force is not applied to the fluid casing 12 or the same external force is applied to the fluid casings 12 on both sides, the fluid does not move.

And for example, assuming that a wearer walks in the ground having a horizontal plane, there is no change in the height of the sole because the entire sole of the shoe uniformly pressurizes the sole contact portion 42 when the sole of the shoe generally comes in contact with the ground. More particularly, assuming that a wearer walks in a flatland, when the wearer starts walking in the state in which the sole generally comes in contact with the sole contact portion 42, the heel of the shoe is first lifted up, and thus the sole of the shoe has an incline state in which the front is low. At this time, the front portion of the feet pressurize the front portion 42F of the sole contact portion 42 of the sole of the shoe.

Figure 8:
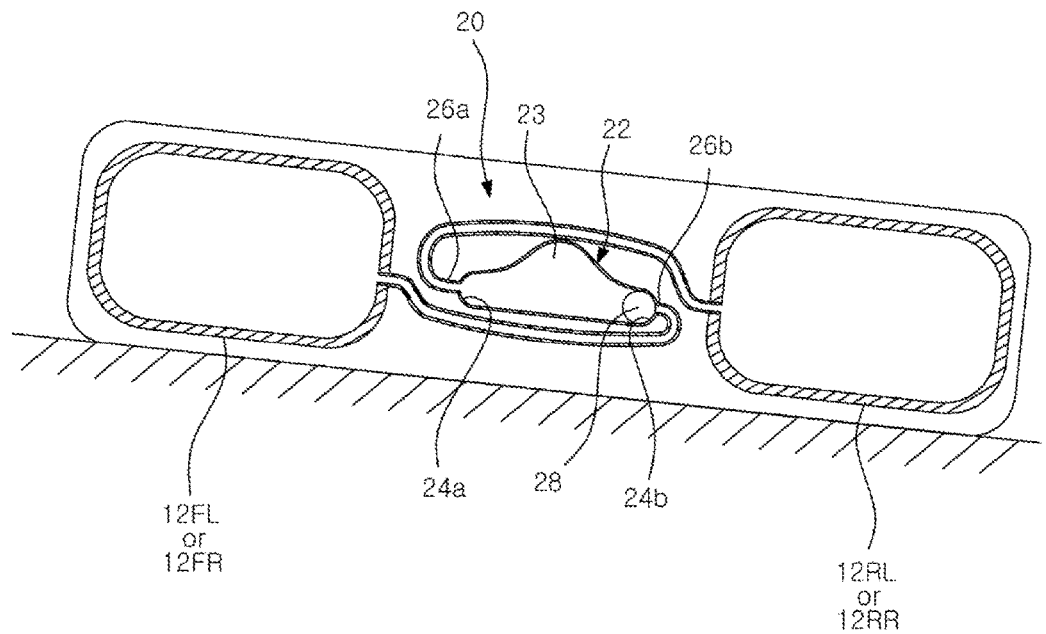
FIG. 8 is an exemplary cross-sectional view in the incline state for illustrating a movement of a fluid within the sole of the shoe in the front and rear direction according to an embodiment of the present invention.

Such an incline state in which the front is low is an incline state having a direction opposite the direction of FIG. 8. In this case, the check ball 28 is seated in the ball seating portion 24a placed ahead or in front direction. Accordingly, the fluid can flow from the fluid casing 12FL or 12FR placed ahead to the internal passage 23, but the fluid cannot exit from the internal passage 23 to the connecting passage 26a placed ahead because the check ball 28 has closely adhered to the ball seating portion 24a placed ahead. Accordingly, in this state, although the ball of the foot presses the front portion 42F of the sole contact portion 42, there is no change in the height of the sole of the shoe because the fluid does not exit from the fluid casing 12FL or 12FR placed ahead.

In this state, the shoe consecutively detaches from the ground. When the shoe detaches from the ground, there is no change in the height of the fluid casing because an external force (i.e., pressure according to the sole) is not applied to the sole contact portion 42. Furthermore, the rear portion 43R of the sole contact portion 42 is pressurized because the heel of the foot first comes in contact with the ground in the process of the shoe landing on the ground.

However, at the moment when a foot lands on the ground while walking, the shoe has an incline state in which the rear portion is low and becomes the same state as that shown in FIG. 8. Furthermore, in this state, pressure is applied to the fluid casings 12RL and 12RR placed in the rear. However, in the state, such as that shown in FIG. 8, a movement of the fluid from the rear fluid casings 12RL and 12RR to the front fluid casings 12FL and 12FR is impossible because the check balls 28 have closely adhered to the ball seating portions 24b placed in the rear.

As may be seen from the above description, while a wearer walks in the ground having a horizontal plane, there is no change in the height of the sole of the shoe because the fluid does not enter or exit from the fluid casings 12. In this case, when the ball of a foot presses the front portion 42F or the heel of the foot presses the rear portion 42R in the state in which the entire bottom of the shoe comes in contact with the ground, the fluid may slightly flow from the fluid casings on one side to the fluid casings on the other side. However, only a small amount of the fluid may flow because the check balls 28 are seated in the ball seating portions 24a, 24b, 24c, and 24d by the flow of the fluid. Such a flow of the small amount of the fluid may not cause a change in the gradient of the sole of the shoe and may assign a cushion function to the shoe. Accordingly, when a wearer walks in a flatland, there is no change in the height of the sole because there is no change in the volume of the fluid within the fluid casings 12. This may be said to be the state in which a restoring force for enabling the plurality of fluid casings 12 in the basic setting state to maintain their original predetermined shape has been applied.

A change in the height of the sole 10 of the shoe in the state in which a flatland changes to an inclined plane (e.g., an uphill) is described below. When a wearer enters the ground inclined in the front and rear direction as shown in FIG. 8, for example, an uphill road from the horizontal state of FIG. 6, the shoe comes in contact with the inclined plane. In this state, the check ball 28 having greater specific gravity than that of fluid (e.g., gas in the present embodiment) is backward pushed and seated in the ball seating portion 24b placed in the rear. Accordingly, a flow of the fluid from the internal passage 23 to the connecting passage 26b is blocked, and only a flow of the fluid introduced into the internal passage 23 through the connecting passage 26b is permitted.

Accordingly, only a flow of the fluid from the connecting passage 26b placed in the rear, connected to the fluid casing 12FL or 12FR placed ahead, to the inside of the internal passage 23 and from the inside of the internal passage 23 to the fluid casing 12RL or 12RR placed in the rear through the connecting passage 26a placed ahead is possible. In this state, when the sole of a foot pressurizes the sole in the state of FIG. 8 as a wearer walks in an inclined ground, the fluid flows from the fluid casing 12FL and 12FR placed ahead to the fluid casings 12RL and 12RR placed in the rear.

In other words, while the wearer walks in the inclined plane as shown in FIG. 8, the sole of the shoe generally maintains the incline state in which the front is high. And pressure is applied to the sole 10 of the shoe when the shoe comes in contact with the ground and thus weight of the wearer is applied to the sole contact portion 42. Furthermore, although the sole contact portion 42 of the sole 10 of the shoe is pressurized as described above in the uphill, shown in FIG. 8, the fluid can flow only from the fluid casings 12FL and 12FR placed ahead to the fluid casings 12RL and 12RR placed in the rear. Accordingly, the height of fluid casings 12RL and 12RR placed in the rear will be increased and the height of the rear portion 42R of the sole 10 is inevitably raised.

Accordingly, in the shoe to which the sole according to an embodiment of the present invention has been applied, the fluid moves to the fluid casings 12RL and 12RR placed in the rear in an uphill, thereby increasing the height of the rear portion 42R. Furthermore, such a partial change of the height may be said to provide a function through which a wearer can walk in an uphill road more conveniently and safely.

A movement of the fluid in such an uphill is summarized below. It may be said that the fluid moves in the state in which at least part of the shoe has come in contact with the ground. In the uphill, the shoe generally has a shape in which the front portion 42F is placed on the upper side. In this state, the fluid cannot move from the front fluid casing to the rear fluid casing because the check ball 28 is seated in the ball seating portion 24d placed in the rear in the valve unit 20 between the fluid casings 12 placed in the front and rear direction.

Accordingly, although the body weight is applied to the sole of the invention, only when a force that presses the fluid casings 12FR and 12FL of the front portion 42F is greater than a force that presses the fluid casings 12RL and 12RR of the rear portion 42R, the fluid can flow from the front fluid casings to the rear fluid casings. And such a principle may be likewise applied to an inclined ground, such as a downhill, and may also be applied to the ground inclined on the left and right side.

A process in which a wearer passes through such an uphill slope and reaches the ground having a horizontal plane and the shoe comes in contact with the ground is described below. The rear portion 42R of the sole first comes in contact with the ground. In such a state, the shoe itself has an incline state in which the front has been lifted up, and the heel of a foot has pressurized the fluid casings 12RL and 12RR placed in the rear of the shoe. Furthermore, the entire surface of the sole of the shoe comes in contact with the ground, the lift portion 42R of the sole is lift up, and thus only the front portion 42F of the sole comes in contact with the ground. That is, a change in the slope of the sole of the shoe in the one step process of a foot is described below. The slope of the sole of the shoe gradually changes from an incline state in which the front portion 42F is high to a horizontal state and then to an incline state in which the front portion 42F is low. Furthermore, the position of the check ball 28 may also be changed depending on such a state.

Furthermore, in the state in which the wearer has passed through the uphill slope and reached the ground having a horizontal plane, the fluid casings 12RL and 12RR placed in the rear have been billowed and become high. Accordingly, unlike in the case where a wearer continues to walk in a flatland, a force applied to the fluid casings 12RL and 12RR having the high state is relatively greater. Accordingly, as described above, at the moment when the fluid can move from the rear fluid casings 12RL and 12RR to the front fluid casings 12FF and 12FL in the one-step process, that is, during the remaining time other than the state in which the check balls 28 have closely adhered to the rear ball seating portions 24b (i.e., while the check balls are placed in the front ball seating portions 24a or in the internal passages 23), if a force in which the heel of the foot pressurizes the rear portion 42R is greater than a force in which the ball of the foot pressurizes the front fluid casings, the fluid can flow from the rear fluid casings 12RL and 12RR to the front fluid casings 12FL and 12FR.

That is, in the state in which the wearer has walked up on the uphill, the fluid moves from the rear fluid casings 12RL and 12RR to the front fluid casings 12FR and 12FL, and thus the sole returns to the basic setting state. The return to the basic setting state as described above will be completed by an operation of several steps not by a one-step operation. In this case, in the first two steps, a relatively large amount of the fluid can flow (from the rear fluid casings to the front fluid casings). Furthermore, it is determined that the elastic restoring force of the fluid casing 12 may contribute to the return of the state of the fluid casings to the basic setting state to some extent.

Furthermore, an example in which a wearer walks in a downhill in a plane inclined in the front and rear direction may be taken into consideration. When the wearer walks in the downhill, the fluid casing 12 is changed in the direction opposite the direction when the wearer walks in an uphill. Accordingly, since the fluid is introduced into the front fluid casings 12FL and 12FR, the front portion 43F of the sole 10 of the shoe becomes high. Furthermore, when the sole reaches a horizontal ground again, the sole returns to the basic setting state according to the same principle as that in the process from the uphill to the flatland.

A change of the sole of the shoe in a plane inclined in the left and right direction while walking is described below with reference to FIGS. 5, 7, and 9. A change in the plane inclined in the left and right direction also has the same principle as a change in the plane inclined in the front and rear direction. When the sole reaches an inclined plane in which the left is high as shown in FIG. 9 in the state of a horizontal ground shown in FIG. 7, the check ball 28 enters the ball seating portion 24d placed on the right and closely adheres thereto.

In this state, the fluid within the fluid casings 12FL and 12RL on the left side can move to the internal passages 23 through the connecting passages 26d and move from the internal passages to the fluid casings 12FR and 12RR on the right side via the connecting passages 26c. At the same time, a flow of the fluid from the fluid casings 12FR and 12RR on the right side to the fluid casings 12FL and 12RL on the left side is blocked by the check balls 28.

Figure 9:
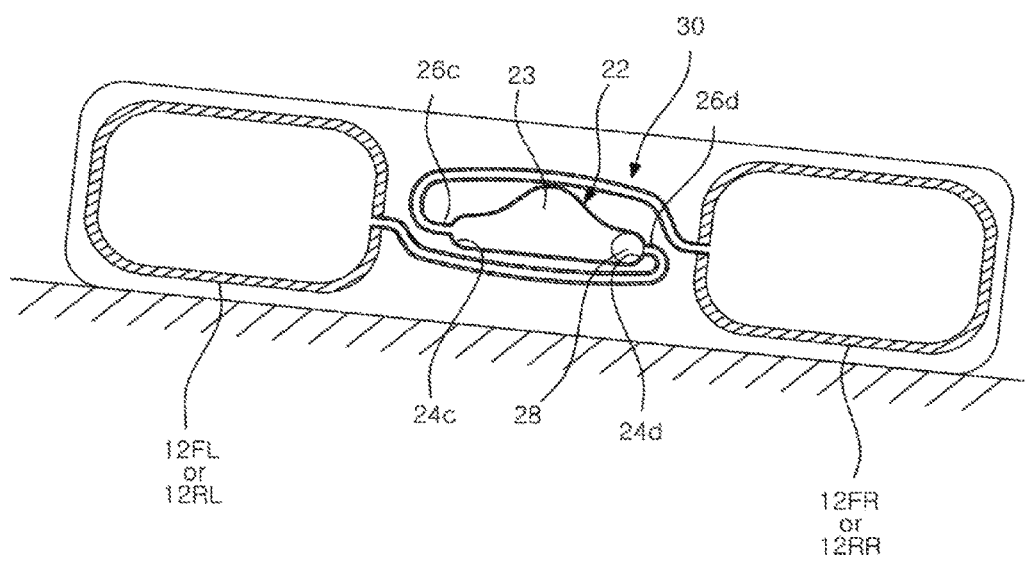
FIG. 9 is an exemplary cross-sectional view in the incline state for illustrating a movement of a fluid within the sole of the shoe in the left and right direction according to an embodiment of the present invention.

Accordingly, in the inclined plane, such as that of FIG. 9, when a user pressurizes the fluid casing 12 through the sole contact portion 42, the fluid flows from the fluid casing placed at a high position to the fluid casing placed at a low position. Accordingly, the inclined plane is corrected by the movement of the fluid as shown in FIG. 2(B), and thus the user becomes close to the horizontal state within a possible range.

And an example of the inclined plane in which the left is high has been described with reference to FIGS. 7 and 9, but the same principle is applied to a flow of the fluid for the correction of a left and right slope in an inclined plane in which the right is high. Furthermore, when the sole returns to a horizontal ground again after walking in the left and right inclined plane, the sole may return to the basic setting state according to the same principle in which the sole returns from the plane inclined in the front and rear direction to the horizontal ground.

The examples in which a weaker walks in the plane inclined in the front and rear direction and the ground inclined in the left and right direction have been separately described above. In most cases, however, the ground has a complex incline in the left and right and front and rear directions. In a complex inclined ground including an incline in the left and right direction and an incline in the front and rear direction as described above, it may be said that the aforementioned flows of the fluids will be complexly generated at the same time.

Furthermore, in the aforementioned embodiment, the fluid within the fluid casing 12 has been illustrated as being gas and the check ball 28 has been illustrated as being made of a metallic material having greater specific gravity and thus has a setting force. A second embodiment of the present invention shown in FIGS. 10 and 11 may be said to be an embodiment in which the fluid within the fluid casings 12A and 12B is a liquid and the check ball 28 is made of a material that has smaller specific gravity than the liquid and thus has buoyancy, that is, a material having smaller specific gravity than that of fluid.

Figure 10:
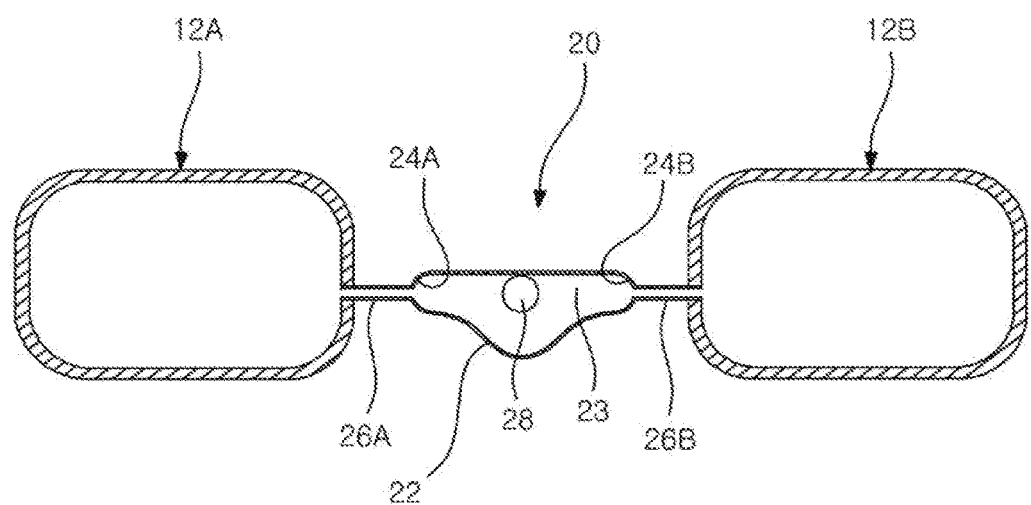
FIG. 10 is an exemplary cross-sectional view in the horizontal state for illustrating a movement of a fluid according to another embodiment of the present invention.
Figure 11:
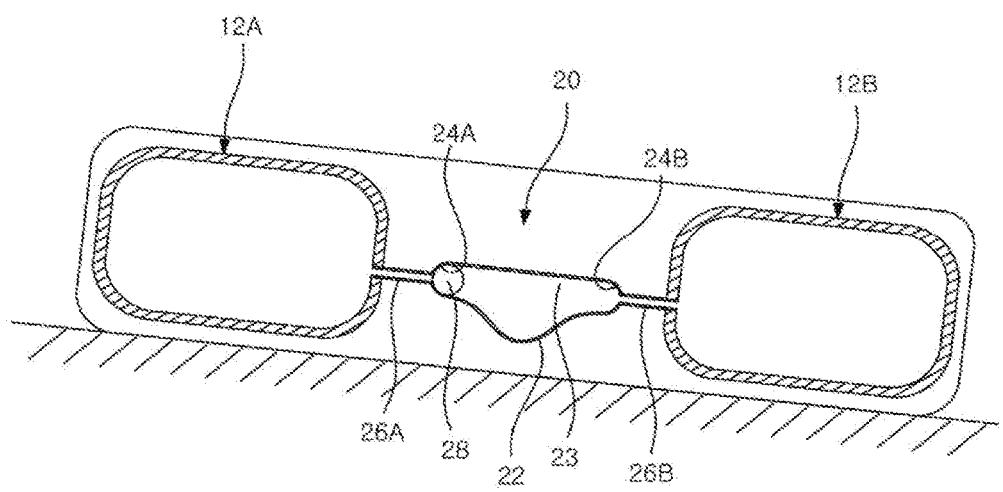
FIG. 11 is an exemplary cross-sectional view in the incline state for illustrating a movement of a fluid according to another embodiment of the present invention.

In the second embodiment, when a wearer walks in an inclined plane, the slope of the sole can be adjusted only when the fluid casing placed at a low position becomes high. Accordingly, as shown in FIGS. 10 and 11, a first fluid casing 12A and a second fluid casing 12B are connected by a valve unit 20 so that a fluid can move within the first fluid casing 12A and the second fluid casing 12B.

And in the present embodiment, as in the aforementioned embodiment, ball seating portions 24A and 24B are formed on both inner sides of a valve body 22 in which an internal passage 23 has been formed. In this case, connecting passages 26A and 26B formed through the insides of the ball seating portions 24A and 24B are connected to the respective fluid casings 12A and 12B in the same direction.

That is, the fluid casing 12A on the left side is connected to the connecting passage 26A formed on the left side of the valve body 22, and the fluid casing 12B on the right side is connected to the connecting passage 26B formed on the right side of the valve body 22. And in the present embodiment, since a check ball 28 has buoyancy, a top surface of the valve body 22 may have a horizontal plane.

In such an embodiment, a change of the fluid casings 12A and 12B when a wearer walks in a flatland is the same as that of the aforementioned embodiment. And when the sole reaches an inclined plane as shown in FIG. 11, the check ball 28 closely contacts the ball seating portion 24A placed at a high position because it has buoyancy. In this case, the fluid can flow only from the fluid casing 12A at a high position to the fluid casing 12B at a low position.

Accordingly, if the fluid is a liquid and the check ball is made of a material having smaller specific gravity so that it has buoyancy as in the present embodiment, the connecting passages connect the fluid casings to adjacent side of valve body. Thus, the fluid can flow from the fluid casing at a high position to the fluid casing at a low position in an inclined ground. Furthermore, even in such an embodiment, a substantial operation is the same as that of the aforementioned embodiment, and a redundant description thereof is omitted.

As described above, in the embodiments of the present invention, when a wearer walks in an inclined ground or stops in the inclined ground, the fluid casing at a low position is billowed so that the height of the sole becomes high. Furthermore, if the fluid is gas, there are advantages in that the weight of a shoe can be reduced and a certain operation can be provided because the check ball having sufficient strength, such as a metallic material, can be used. Furthermore, if the fluid is a liquid and the check ball having buoyancy is used, there is an advantage in that the connecting passages on the left and right (front and rear) of the valve body can be connected to the fluid casings more conveniently.

As described above, those skilled in the art to which the present invention pertains may modify the present invention in various ways without departing from the technical spirit of the present invention, and the scope of the present invention should be interpreted based on the claims.

What is claimed is:

1. A sole for a shoe, comprising:
    a plurality of fluid casings of elastic property arranged in the sole, the plurality of fluid casings including a front left casing and a front right casing arranged in a front side of the sole, and a rear left casing and a rear right casing arranged in a rear side of the sole; and
    a plurality of valve units connected between the plurality of fluid casings and configured to permit a flow of a fluid only from a first fluid casing of the plurality of fluid casings at a higher position to a second fluid casing of the plurality of fluid casings at a lower position when the sole is inclined in at least one of a front and rear direction and a left and right direction,
    wherein when the sole of the shoe is inclined, a height of the second fluid casing at the lower position is increased by the flow of fluid entering from the first fluid casing at the higher position to the second fluid casing at the lower position and by pressure applied to the first fluid casing at the higher position,
    wherein each valve unit of the plurality of valve units comprises:
        a valve body having an internal passage through which the fluid within the fluid casing is configured to pass,
        a pair of ball seating portions formed on both of the inner ends of the internal passage,
        a check ball located in the internal passage, and configured to permit a unidirectional flow of the fluid when the check ball is seated in one of the ball seating portions, and to permit a bidirectional flow of the fluid when the check ball is in the middle of the internal passage, and
        a pair of connecting passages connected, through the ball seating portions,
            between the front left fluid casing and the front right fluid casing,
            between the rear left fluid casing and the rear right fluid casing,
            between the front left fluid casing and the rear left fluid casing, or
            between the front right fluid casing and the rear right fluid casing.

2. The sole of claim 1,
    wherein the check ball is made of a material having a greater specific gravity than the fluid,
    wherein the pair of connecting passages connect two fluid casings and the valve body in opposite directions, and
    wherein the check ball of the each valve unit is to be seated in the ball seating portion at the lower position when the each valve unit is inclined, so that the fluid flows only from the fluid casing at higher position to the fluid casing at lower position.

3. The sole of claim 1, wherein:
    wherein the check ball is made of a material having a smaller specific gravity than the fluid,
    wherein each connecting passage of the pair of connecting passages connects the valve body and an adjacent fluid casing of the plurality of fluid casings, and
    wherein the check ball of the each valve unit is to be seated in the ball seating portion at the higher position when the each valve unit is inclined, so that the fluid flows only from the fluid casing at higher position to the fluid casing at lower position.

4. A sole for a shoe, comprising:
a pair of fluid casings of elastic property arranged in the sole, the pair of fluid casings including a front fluid casing arranged in a front side of the sole and a rear fluid casing arranged in a rear side of the sole; and
a valve unit connected between the front and rear fluid casings and configured to permit a flow of a fluid only from a fluid casing of the pair of fluid casings at a higher position to the other fluid casing of the pair of fluid casings at a lower position when the sole is inclined in a front and rear direction,
wherein when the sole of the shoe is inclined in the front and rear direction, a height of the fluid casing at the lower position is increased by the flow of fluid entering from the fluid casing at the higher position to the fluid casing at the lower position by pressure applied to the fluid casing at the higher position,
wherein the valve unit comprises:
  a valve body having an internal passage with two inner ends through which the fluid within the pair of fluid casings is configured to pass,
  a pair of ball seating portions formed on both of the inner ends of the internal passage,
  a check ball located in the internal passage, and configured to permit a unidirectional flow of the fluid when the check ball is seated in one of the ball seating portions, and to permit a bidirectional flow of the fluid when the check ball is in the middle of the internal passage, and
  a pair of connecting passages connected between the front fluid casing and the rear fluid casing, through the ball seating portions.

5. A sole for a shoe, comprising:
a pair of fluid casings of elastic property arranged in the sole, the pair of fluid casings including a left fluid casing arranged in a left side of the sole and a right fluid casing arranged in a right side of the sole; and
a valve unit connected between the left and right fluid casings and configured to permit a flow of a fluid only from a fluid casing of the pair of fluid casings at a higher position to the other fluid casing of the pair of fluid casings at a lower position when the sole is inclined in a left and right direction,
wherein when the sole of the shoe is inclined in the left and right direction, a height of the fluid casing at the lower position is increased by the flow of fluid entering from the fluid casing at the higher position to the fluid casing at the lower position by pressure applied to the fluid casing at the higher position,
wherein the valve unit comprises:
  a valve body having an internal passage with two inner ends through which the fluid within the pair of fluid casings is configured to pass,
  a pair of ball seating portions formed on both of the inner ends of the internal passage,
  a check ball located in the internal passage, and configured to permit a unidirectional flow of the fluid when the check ball is seated in one of the ball seating portions, and to permit a bidirectional flow of the fluid when the check ball is in the middle of the internal passage, and
  a pair of connecting passages connected between the left fluid casing and the right fluid casing, through the ball seating portions.

\* \* \* \* \*